(12) United States Patent
Das

(10) Patent No.: US 9,336,406 B2
(45) Date of Patent: May 10, 2016

(54) MULTIPROTOCOL ACCESS CONTROL LIST WITH GUARANTEED PROTOCOL COMPLIANCE

(71) Applicant: FUTUREWEI TECHNOLOGIES, INC., Plano, TX (US)

(72) Inventor: Kalyan Das, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/080,669

(22) Filed: Nov. 14, 2013

(65) Prior Publication Data
US 2015/0135331 A1  May 14, 2015

(51) Int. Cl.
*G06F 21/60* (2013.01)
*G06F 21/62* (2013.01)

(52) U.S. Cl.
CPC .................. *G06F 21/6218* (2013.01)

(58) Field of Classification Search
CPC ........................................ G06F 21/60
USPC ............................................................ 726/27
See application file for complete search history.

(56) References Cited

U.S. PATENT DOCUMENTS

| 6,279,011 B1* | 8/2001 | Muhlestein | 714/6.3 |
| 2001/0039622 A1* | 11/2001 | Hitz et al. | 713/201 |
| 2002/0019874 A1* | 2/2002 | Borr | 709/229 |
| 2010/0325588 A1* | 12/2010 | Reddy et al. | 715/853 |

* cited by examiner

*Primary Examiner* — William Powers
(74) *Attorney, Agent, or Firm* — Futurewei Technologies, Inc.

(57) ABSTRACT

An approach to multiprotocol ACL implementation with guaranteed protocol compliance is described. In one approach, a method of access rights validation for a multiprotocol supported file server is detailed. The method involves receiving a request to store a file with a security descriptor and storing the security descriptor in an extended attribute associated with the file. Subsequently, the security descriptor is expanded to extract a set of ACEs. Access to the file can then be validated against the ACEs expanded from the security descriptor according to the specifications of the protocol that created the security descriptor.

20 Claims, 4 Drawing Sheets

MULTIPROTOCOL ACCESS CONTROL LIST WITH GUARANTEED PROTOCOL COMPLIANCE

FIELD

The present invention generally relates to the field of file access control. More specifically, the present invention relates to providing access control lists with guaranteed protocol compliance.

BACKGROUND

There is a growing need, in the field of computer networks, to provide access to the content of file servers through multiple file access protocols. In every case, it is expected that the access rights are properly preserved and validated, regardless of the access protocol used. For example, it might be desirable to create a security descriptor for a file using an NFS client and subsequently provide an SMB client with access to the file.

Unfortunately, the tools available to network administrators to provide this kind of access control are extremely limited. The challenge is that the different file access protocols expect different access control support from the underlying file system. Various file server vendors have tried different ways to solve this issue. Some vendors designed brand new file systems capable of storing all known access control structures required by various file access protocols. Others use an intermediate broker with understanding of various ways to resolve the access rights that expected to satisfy different protocol clients.

Other prior solutions have required maintaining a complex inode data structure to accommodate various forms of access control entries (ACEs), such as NT/SID and UNIX/UID, for example. These implementations generally require transformation of the ACL into a generic form. This type of transformation raises a chance of losing protocol compliance because any reproduction of a security descriptor may not be identical to the security descriptor as created by the protocol client.

SUMMARY

An approach to multiprotocol ACL implementation with guaranteed protocol compliance is described. In one approach, a method of access rights validation for a multiprotocol supported file server is detailed. The method involves receiving a request to store a file with a security descriptor and storing the security descriptor in an extended attribute associated with the file. Subsequently, the security descriptor is expanded to extract a set of ACEs. Access to the file can then be validated against the ACEs expanded from the security descriptor according to the specifications of the protocol that created the security descriptor. In some cases it will be necessary to map the user ID of the protocol attempting to access the file to an ID supported by the protocol that created the security descriptor.

Another described approach details a computer usable medium having computer readable program code embodied therein for causing a computer system to execute a method of access rights validation for a multiprotocol supported file server. This approach includes receiving a request to store a file with a security descriptor and storing the security descriptor in an extended attribute associated with the file. Subsequently, the security descriptor is expanded to extract a set of ACEs. Any attempt at accessing the file will be validated against the ACEs expanded from the security descriptor according to the specifications of the protocol that created the security descriptor. Again, in some cases it will be necessary to map the user ID of the protocol attempting to access the file to an ID supported by the protocol that created the security descriptor.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
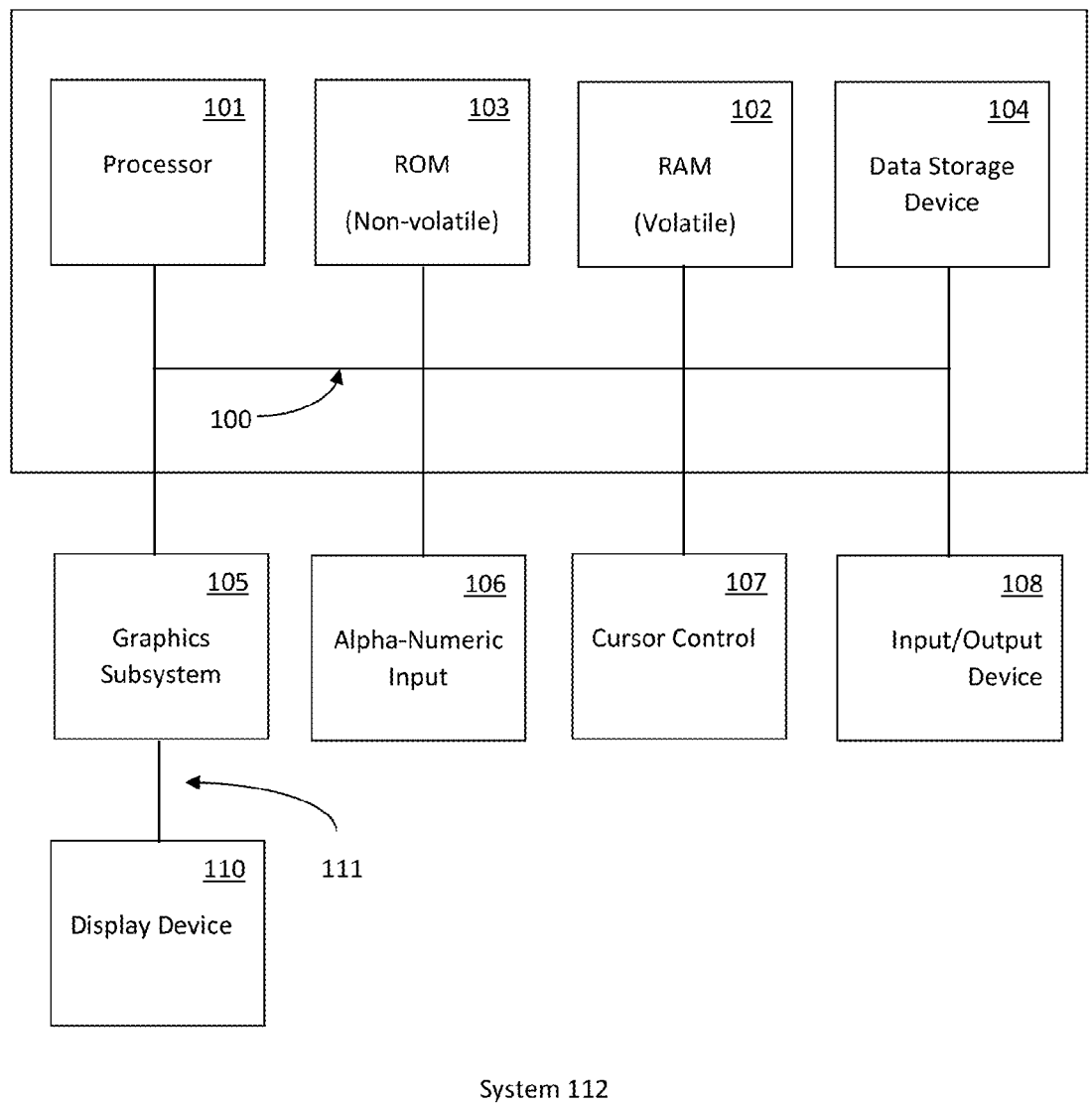
FIG. 1 is a block diagram of an exemplary computer system upon which embodiments of the present invention may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system 112 depicted in FIG. 1, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Multiprotocol Access Control List with Guaranteed Protocol Compliance

In the following embodiments, an approach is described for providing access rights validation for a multiprotocol supported file server. This approach takes a security descriptor for a given file stored on a file server, stores the security descriptor as part of the file descriptor maintained by the file system for the given file, and validates subsequent access requests to the file over multiple file access protocols. Generally, only one form of security descriptor will be maintained, and the security descriptor will be preserved in its original form. As long as the file is accessed from a client using the same protocol through which the security descriptor was created, the access rights validation will be in compliance with the protocol specification. For example if the file access protocol used is SMB, which expects the access rights are set and validated following the NTFS file system's specification, the only way this can be ensured if the security descriptor is preserved in form of NTFS defined construct.

Some file server vendors implemented a security structure as a superset of all protocol specific security entries, but that structure does not guarantee that the security entries once transformed can be retrieved in its original form or in original sequence. At the same time it is impractical to maintain multiple security structures in a file's metadata. Instead, in one embodiment, the original security descriptor is preserved in the form of byte sequence. The file system provides a mechanism of storing new attributes in the form of name-value pairs. Almost all recent file systems provide such facility through extended attributes with very generic interfaces such as setxattr( ) and getxattr( ).

Therefore, separate named attributes are assigned for each different form of security descriptors. For example if the file server provides file access through SMB, NFSv4, NFSv3, FTP, HTTP, and some local applications, we can clearly identify three forms of access controls namely NTFS, NFSv4, and POSIX. Consequently, a named attribute such as NTFS_ACL can be used when the incoming security descriptor is from an SMB client. The incoming security descriptor is then stored as sequence of bytes against the extended attribute NTFS_ACL. Similarly there could be NFS4_ACL and POSIX_ACL. Since the security descriptors can be of variable length, the restriction on the size limit for a named attribute's value should be considered while implanting. Some file systems limit the size to its block size, while others limit to a higher or even unlimited size.

In one embodiment, a named attribute ACL_FLAG is utilized to keep the information about the specific form of security descriptor stored. The flag may contain other information specific to named ACL that can be used when processing. The ACL_FLAG and the actual named ACL is read when a file is opened for the first time. The security descriptor is then parsed and ACEs are extracted and stored in a sequence following the protocol specification. The ACL structure is stored along with the open state of the file object. All new incoming requests to the file are validated against this ACL following the protocol specification. Therefore, if the creator and the subsequent requesters all belong to the same protocol, the access control behavior is guaranteed to be 100% compliant with the protocol's native file system.

In one embodiment, an implementation provides 100% compliance to the owner protocol of the file. The owner protocol refers to the file access protocol through which the security descriptor of the file is set. A 100% protocol compliancy is possible if the security descriptor is maintained in the original form as was received from the protocol client and the validation is conducted following the same protocol's specification.

To provide the cross protocol rights validation, validation is performed following the specification of the security descriptor's protocol. This implies that if the file currently holds NTFS_ACL, and a new open request arrives from an NFS client, the new access request parameters will be validated against the NTFS_ACL as if the request is initiated from an SMB client. To do so, the UID or the username associated with the NFS session will be mapped to Windows specific SID. The proposed scheme ensures that the ACL is never get transformed from one type to another. The only transformation happens for the ACL is for generating UNIX mode-bits attributes for the file. The mode bits are generated when a new security descriptor is created or an existing one is replaced.

In a multiprotocol environment, if a new security descriptor is set by a protocol client that is different from the existing security descriptor, the new protocol specific ACL named attributes replaces the old one. For example, if a file was originally created by an SMB client, a security descriptor with the attribute name NTFS_ACL would be associated with the file. Subsequently if an NFSv4 client with adequate access right sets a new security descriptor for the file, the NTFS_ACL attribute will be replaced by an NFS4_ACL attribute containing NFSv4 formatted security descriptor. Now, if the file is again accessed by an SMB client, the user's security ID (SID in Windows) will be mapped to an UNIX ID (UID) and the access validation will be done according to NFSv4 specification.

The protocol components that are not purely POSIX compliant must maintain their non-POSIX states in the multiprotocol access handling (MPA) module. In some embodiments, the MPA module will maintain a file open state in addition to the file's security descriptor to prohibit writing to a file while it is already being accessed by another user. When access to an already opened file is requested, the incoming request is sent to the MPA for validation along with the associated access mode and mapped user ID. The access mode is utilized by the underlying system to indicate whether the access request is of a read, write, or execute type, for example.

Figure 2:
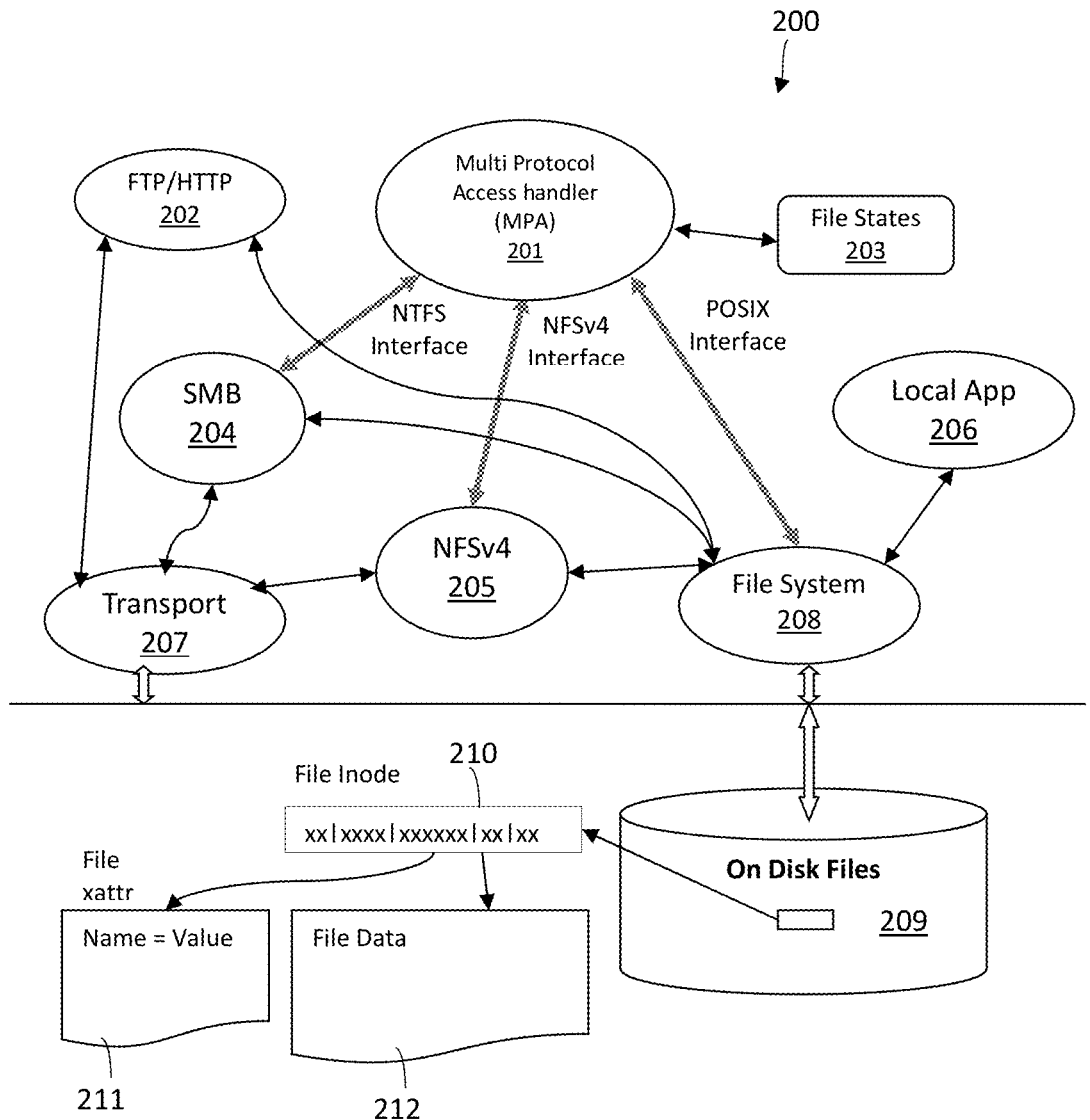
FIG. 2 is a diagram illustrating an exemplary environment for providing multiprotocol access validation with guaranteed protocol compliance.

With reference now to FIG. 2, exemplary environment 200 for an implementation of multiprotocol access handling is depicted, in accordance with one embodiment. While environment 200 is shown as incorporating specific, enumerated features, it is understood that embodiments are well suited to applications involving additional, fewer, or different features or arrangements.

As shown, the on disk files 209 are associated with extended attributes in file inode 210. Each attribute 211 is stored as a name-value pair in the extended attributes of the inode 210, in addition to file data 212. The on disk files 209 are opened by accessing file system 208. File system 208 is connected to local app 206, MPA 201, FTP/HTTP server 202, SMB server 204, and NFSv4 server 205, each over a separate interface. MPA 201 is connected to SMB server 204 connected over an NTFS interface, to NFSv4 server 205 over an NFSv4 interface, and to the file system over a POSIX interface. Additionally, the MPA stores file states 203, such as the file open state, for example. Requests from various client such as SMB, NFSv4 and FTP/HTTP are received by transport mechanism 207. All protocol components that are not purely POSIX are required to maintain their non-POSIX states in the multiprotocol access handling module (MPA).

Figure 3:
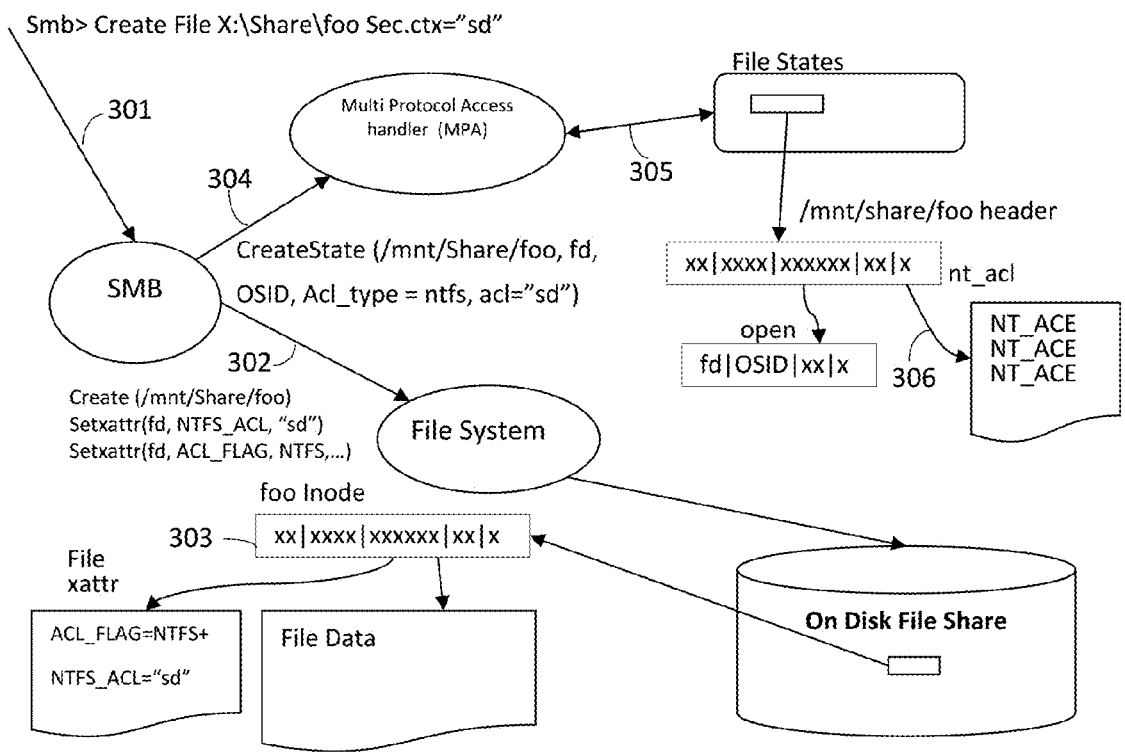
FIG. 3 is a diagram illustrating an exemplary sequence of activities for an SMB client creating a file with an associated NTFS security descriptor.

With reference now to FIG. 3, flowchart 300 for creating a file and setting a security descriptor is depicted, in accordance with one embodiment. Although specific steps are disclosed in flowchart 300, such steps are exemplary. That is, embodiments of the present invention are well suited to performing various other (additional) steps or variations of the steps recited in flowchart 300. It is appreciated that the steps in flowchart 300 may be performed in an order different than presented, and that not all of the steps in flowchart 300 may be performed.

With reference to step 301, an SMB client issues a request to create a file 'foo' at the location 'X:\Share\' with a security context 'sd'. This request is initially broken into three requests by the SMB server module. At step 302, the file is created at the specified location on the file system. Additionally, the extended attributes are set based on the security context and requesting client type. In this case, because the requesting client is an SMB client, the ACL_FLAG attribute will be set to NTFS. The ACL_FLAG may contain other information specific to named ACL that can be used when processing. The attribute NTFS_ACL will be used to store the security descriptor 'sd'.

With reference to step 303, the request to store the extended attributes is processed and the file inode (with the extended attribute) is created on the disk for the file 'foo'. At step 304, the file's open state and the security descriptor 'sd' are handed over to the MPA module. At step 305, the file state is created in the MPA data store. The file state will be used to track the file's open state, among other information. At step 306, the security descriptor is expanded and the ACEs are stored in the NTFS formatted ACL.

Considering the ACEs contain IDs for the users that are given or denied certain rights, and these IDs are maintained differently in different protocols, an ID mapping is required if incoming requesting protocol is different from the ACL associated with the file. In a multiprotocol environment, when a user session is authenticated, the IDs are mapped from one form to the other. It is expected that a mapped ID will be available when a new file open request arrives.

Figure 4:
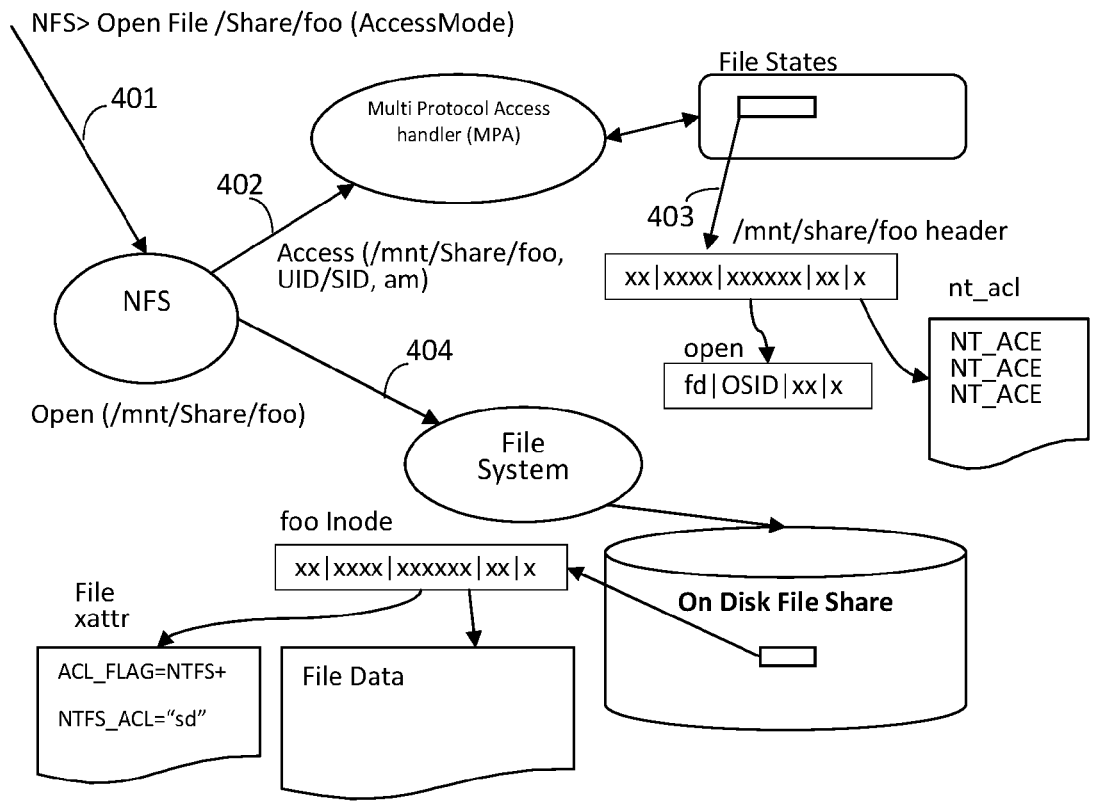
FIG. 4 is a diagram illustrating an exemplary sequence of activities for NFS access validation against an NTFS security descriptor and file open state.

With reference now to FIG. 4, flowchart 400 for receiving an open request is depicted, in accordance with one embodiment. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference to step 401, an NFS request to open the same file 'foo' located at '/mnt/share' is received with a specified access mode. In this example, the file 'foo' is already opened by an SMB client. Because the file is already opened, the incoming open request, along with the specified access mode and mapped user ID, are sent to the MPA for validation. At step 402, the access request is received by the MPA. At step 403, the incoming access mode is validated against the existing open state associated with the file 'foo' and the mapped user ID is validated against the expanded ACE list. If the request is validated against the file's open state and expanded ACE list, the file open request is made to the file system at step 404.

According to some embodiments, a mapping table is maintained and comprises a data structure for storing user IDs mapped across multiple access protocols. The mapping table is used to convert user IDs from one protocol specification to another. For example, in some situations the UID or the username associated with an NFS session will be mapped to a Windows specific SID using a mapping table.

According to some embodiments, a user ID may be mapped synthetically, that is to say, according to the specifications of the protocol that created the security descriptor. For example, the Microsoft specification provides for synthetic mapping in form of <uid>=S-1-5-88-1-<uid> and <gid>=S-1-5-88-2-<gid>.

According to some embodiments, in situations where no mapping for the incoming user's ID is found that can be used against the IDs in the ACEs, the incoming user will be considered an anonymous user ("everyone" in NTFS and "others" in POSIX).

What is claimed is:

1. A method of access rights validation for a multiprotocol supported file server, comprising:
   receiving a request to store a file on a file server from an owner protocol, the request to store comprising the file and a security descriptor;
   storing the file on the file server;
   storing the security descriptor according to a specification of the owner protocol in an extended attribute associated with the file;
   receiving a request to open the file from a requestor protocol having a user ID;
   expanding the security descriptor to extract a set of ACEs (access control entries), wherein the set of ACEs comprises at least one of an NTFS, an NFS, and a POSIX access control entry;
   transforming the user ID to a mapped ID according to the specification of the owner protocol; and
   validating the mapped ID against the set of ACEs expanded from the security descriptor according to the specification of the owner protocol.

2. The method of claim 1, wherein the request to open the file comprises an access mode.

3. The method of claim 2, further comprising validating the access mode against an open state of the file.

4. The method of claim 3, further comprising:
   sending the request to open the file, the security descriptor, and an open state to a multiprotocol access handler;
   upon receiving the request to open the file, validating the access mode against the open state at the multiprotocol access handler and validating the user ID against the set of ACEs expanded from the security descriptor at the multiprotocol access handler.

5. The method of claim 1, further comprising:
   setting a mode bit associated with the file based on the security descriptor.

6. The method of claim 1, wherein the user ID is transformed using a mapping table.

7. The method of claim 1, wherein the user ID is transformed according to a specification of the owner protocol.

8. The method of claim 1, wherein a user ID will be treated as a member of an unauthenticated user group if no mapped ID is available.

9. The method of claim 1, wherein the extended attribute is contained in an inode associated with the file.

10. The method of claim 9, wherein the file system is POSIX compliant.

11. An apparatus for performing access rights validation for a multiprotocol supported file server, comprising:
    a main memory;
    a data storage device; and
    a processor communicatively coupled to the main memory and the data storage device that receives a request to store a file on the data storage device from an owner protocol, the request to store comprising the file and a security descriptor, stores the file on the data storage device, stores the security descriptor according to a specification of the owner protocol in an extended attribute associated with the file, receives a request to open the file from a requestor protocol having a user ID, expands the security descriptor to extract a set of ACEs (access control entries) in the main memory, wherein the set of ACEs comprises at least one of an NTFS, an NFS, and a POSIX access control entry, transforms the user ID to a mapped ID according to the specification of the owner protocol, and validates the mapped ID against the set of ACEs expanded from the security descriptor according to the specification of the owner protocol.

12. The apparatus of claim 11, wherein the request to open the file further comprises an access mode.

13. The apparatus of claim 12, wherein the processor validates the access mode against an open state of the file.

14. The apparatus of claim 13, further comprising:
    sending the request to open the file, the security descriptor, and an open state to a multiprotocol access handler; and
    upon receiving the request to open the file, validating the access mode against the open state at the multiprotocol access handler and validating the user ID against the set of ACEs expanded from the security descriptor at the multiprotocol access handler.

15. The apparatus of claim 11, further comprising:
    setting a mode bit associated with the file based on the security descriptor.

16. The apparatus of claim 11, wherein the user ID is transformed using a mapping table.

17. An apparatus for providing access rights validation for a multiprotocol supported file server, comprising:
    a multiprotocol access handler circuit configured to receive a request to store a file on a file system from an owner protocol, the request to store comprising the file and a security descriptor; and
    memory coupled to the multiprotocol access handler circuit configured to:
       store the file on the file server;
       store the security descriptor according to a specification of the owner protocol in an extended attribute associated with the file; and
       expand the security descriptor to extract a set of ACEs (access control entries) in response to receiving a request to open the file from a requestor protocol having a user ID,
    wherein the user ID is transformed to a mapped ID according to the specification of the owner protocol, and the mapped ID is validated against the set of ACEs expanded from the security descriptor by the multiprotocol access handler circuit according to the specification of the owner protocol, wherein the set of ACEs comprises at least one of an NTFS, an NFS, and a POSIX access control entry.

18. The apparatus of claim 17, wherein the request to open further comprises an access mode and the access mode is validated by the multiprotocol access handler circuit against an open state of the file.

19. The apparatus of claim 17, wherein a mode bit associated with the file is set based on the security descriptor.

20. The apparatus of claim 17, further comprising a mapping table configured to map a user ID to a mapped ID according to a specification of the owner protocol.

* * * * *